United States Patent [19]
Visigalli

[11] Patent Number: 5,697,323
[45] Date of Patent: Dec. 16, 1997

[54] METHOD AND MACHINE FOR MILKING

[75] Inventor: Ercolino Visigalli, Soresina, Italy

[73] Assignee: Alfa Laval Agri AB, Tumba, Sweden

[21] Appl. No.: 624,372

[22] PCT Filed: Sep. 27, 1994

[86] PCT No.: PCT/EP94/03223

§ 371 Date: May 30, 1996

§ 102(e) Date: May 30, 1996

[87] PCT Pub. No.: WO95/09526

PCT Pub. Date: Apr. 13, 1995

[30] Foreign Application Priority Data

Oct. 1, 1993 [IT] Italy .............. MI93A2111 U

[51] Int. Cl.$^6$ ...................................... A01J 5/16
[52] U.S. Cl. ...................................... 119/14.02
[58] Field of Search .............. 119/14.02, 14.07, 119/14.29, 14.3, 14.38

[56] References Cited

U.S. PATENT DOCUMENTS

| | | | |
|---|---|---|---|
| 3,172,391 | 3/1965 | Norton | 119/14.02 |
| 3,234,906 | 2/1966 | Jensen | 119/14.02 |
| 3,754,632 | 8/1973 | Troberg et al. | |
| 4,292,926 | 10/1981 | Tilman | |
| 4,391,221 | 7/1983 | Hoefelmayr et al. | |
| 5,090,359 | 2/1992 | Pettersson et al. | |
| 5,218,924 | 6/1993 | Thompson et al. | |
| 5,443,035 | 8/1995 | Lind et al. | 119/14.02 |

FOREIGN PATENT DOCUMENTS

| | | |
|---|---|---|
| 2530119 | 7/1983 | France . |
| 2588155 | 10/1985 | France . |
| 2071982 | 9/1981 | United Kingdom . |

*Primary Examiner*—John G. Weiss
*Assistant Examiner*—David J. Cho
*Attorney, Agent, or Firm*—Hovey,Williams, Timmons & Collins

[57] ABSTRACT

An animal is milked by periodically alternating the milking of each teat between a first mode of operation (I), in which the liner on the teat is exposed to an exterior pulsating vacuum causing the liner to open and close in a series of pulsation cycles, and a second mode of operation (II), in which the liner is exposed to an exterior substantially constant vacuum, which is high enough to keep the liner in a substantially fully open state. The duration of the second mode (II) is at least as long as the duration of a plurality of pulsation cycles of the first mode (I).

18 Claims, 4 Drawing Sheets

METHOD AND MACHINE FOR MILKING

BACKGROUND OF INVENTION

1. Field of Invention

The present invention relates to a method of milking an animal, in which the animal's teats are inserted into collapsable tubular liners and the interior of the liners is exposed to a milking vacuum for extracting milk from the teats. The invention also relates to a milking machine for performing the method of milking.

2. Description of the Prior Art

A cow to be milked is prepared by massaging the udder and the teats for relaxing muscles in the latter, in order to make free passages for milk between the interior of the udder and the teats. The massage also stimulates the cow, so that the hormone oxytocin is activated to cause the alveoli of the udder to contract and press out milk. The effect of the oxytocin appears about one minute after the preparation of the cow for milking and is effective during about four to seven minutes. Accordingly, milking should be completed during that time, in order to achieve a high milk yield, because after that the cow does not cooperate actively.

The achievement of a high milk yield is also dependent on that the cow is not disturbed or treated roughly or painfully during milking. Otherwise, the hormone adrenalin might be released and cause the udder muscles to contract, whereby the milk cannot leave the alveoli area.

The milking vacuum evacuates air in the liners under the teats, so that milk is sucked out of each teat through the streak canal at the tip of the teat. In the following, the term "vacuum" is defined to mean any pressure below atmospheric pressure, specified as the reduction below ambient atmospheric pressure. Since the milk cannot be sucked out continuously as this would prevent the blood circulation in the teat and cause the cow to feel pain, it is common practice to expose the liners to an exterior pulsating vacuum, typically alternating between atmospheric pressure and a peak vacuum level of the same level as the milking vacuum level. When a liner is exposed to atmospheric pressure it squeezes its teat so that milk ejection is interrupted and the teat is at rest, with the result that the blood circulation in the teat is promoted.

In practice, so-called teatcups are used to provide said exterior pulsating vacuum. A teatcup comprises a liner and a tubular rigid shell enclosing the liner, whereby a pulsation chamber is formed between the liner and the shell. In milking machines currently marketed by Alfa Laval, the pulsation chamber of each teatcup is exposed to a pulsating vacuum having a rate of typically 60 cycles/minute and varying between atmospheric pressure and a peak vacuum level of about 42–46 kPa and 48–50 kPa for low level milking system and high level milking system, respectively, while the interior of the liner under the teat is exposed to a milking vacuum of about the same level as the peak vacuum level.

The relatively strong milking vacuum is needed primarily for ensuring a safe attachment of the teat cups to the teats and, secondary, for achieving a rapid milking and a high milk yield. However, a disadvantage of such a strong milking vacuum is that it might treat the teats roughly, especially at the beginning and at the end of the milking interval when there is no or insignificant milk flow through one or more teats. Attempts have been made to eliminate this disadvantage by milking according to different modes of operation dring the milking interval, in order to provide for a gentle milking also at the beginning and at the end of the milking interval.

Thus, U.S. Pat. No. 3,754,532, U.S. Pat. No. 4,292,926 and U.S. Pat. No. 5,090,359 disclose various milking methods in which the vacuum conditions in the teatcups are controlled in response to milk flow, in order to treat the teats gently.

It is also known to milk according to different modes of operation during the milking interval for other reasons than for providing a gentle teat treatment. For example, U.S. Pat. No. 5,218,924 discloses a milking method in which the rate of liner opening movement is changed in response to elapsed time or milk flow. More specifically, the liners are opened at a faster rate at the beginning of the milking interval, than during the middle of the milking interval, in order to provide deeper teat penetration into the liner, and are opened at a slower rate at the end of the milking interval than during the middle of the milking interval, in order to limit loss of adhesion between the liner and the teat.

Another example is U.S. Pat. No. 4,391,221 disclosing a milking method in which the pulsation rate is increased to typically 300 cycles/minute at the beginning of the milking interval, in order to improve the stimulation of the teats.

SUMMARY OF THE INVENTION

The object of the present invention is to provide a simple method of milking, which treat the animals carefully.

This object is obtained by a method of the kind stated initially, which is characterized by periodically alternating the milking of each teat between a first mode of operation, in which the liner on the teat is exposed to an exterior pulsating vacuum causing the liner to open and close in a series of pulsation cycles, and a second mode of operation, in which the liner is exposed to an exterior substantially constant vacuum, which is high enough to keep the liner in a substantially open state, the duration of the second mode of operation being at least as long as the duration of a plurality of pulsation cycles of the first mode of operation.

During the first mode of operation a teat can be relaxed by using a sufficiently high pulsation rate, at least 90 cycles per minute and preferably about 180 cycles per minute. As a result, the liner on the teat will not open completely or just for a very short while during each pulsation cycle, which promotes the blood circulation in the teat. The reduced milk ejection which inevitably appears during the first mode of operation is compensated by the large milk ejection taking place during the second mode of operation when the liner is kept open for a comparably long time.

When milking an animal having four teats, such as a cow, two of the teats may be milked according to the first mode of operation, while the other two teats are milked according to the second mode of operation.

It is preferred, however, to milk the teats sequentially according to the second mode of operation. This means that a cow having four teats (there are cows having only three teats) is milked such that three teats are milked according to the first mode of operation, while one teat is milked according to the second mode of operation. Said sequential milking of the teats has proved to be most favourable with regard to teat treatment and to provide a stable vacuum condition in the milking claw.

The milking vacuum level may be substantially reduced, for instance, from normally 44 kPa for low level milking to about 25–30 kPa, without risking the milking cluster falling off. Such a comparatively low milking vacuum level provides for an extraordinary gentle treatment of the teats. It has been proved experimentally that contrary to expectation said substantial reduction of the milking vacuum does not prolonge the milking time more than insignificantly, when milking a cow according to the milking method of the invention. Another advantage is that the energy consumption of the vacuum pump for generating the milking vacuum is reduced.

Suitably, the duration of the first mode of operation is three seconds, whereas the duration of the second mode of operation is one second, when milking the cow's four teats in sequence.

The invention also relates to a milking machine for performing the method according to the invention, comprising a milking cluster having a number of teatcups with liners for receiving teats to be milked, a pulsation chamber being defined between each teatcup and its liner, and means adapted to connect a source of vacuum to the respective pulsation chambers independently of one another and being operable to periodically alternate between a first mode of operation, in which said means cyclically connects the source of vacuum to any pulsation chamber to provide a pulsating vacuum therein, and a second mode of operation, in which said means maintains the source of vacuum connected to the last-mentioned pulsation chamber to provide a constant vacuum therein.

BRIEF DESCRIPTION OF THE DRAWINGS

The invention is explained in more detail in the following with reference to the accompanying drawings, in which.

DESCRIPTION OF THE PREFERRED EMBODIMENT

Figure 1:
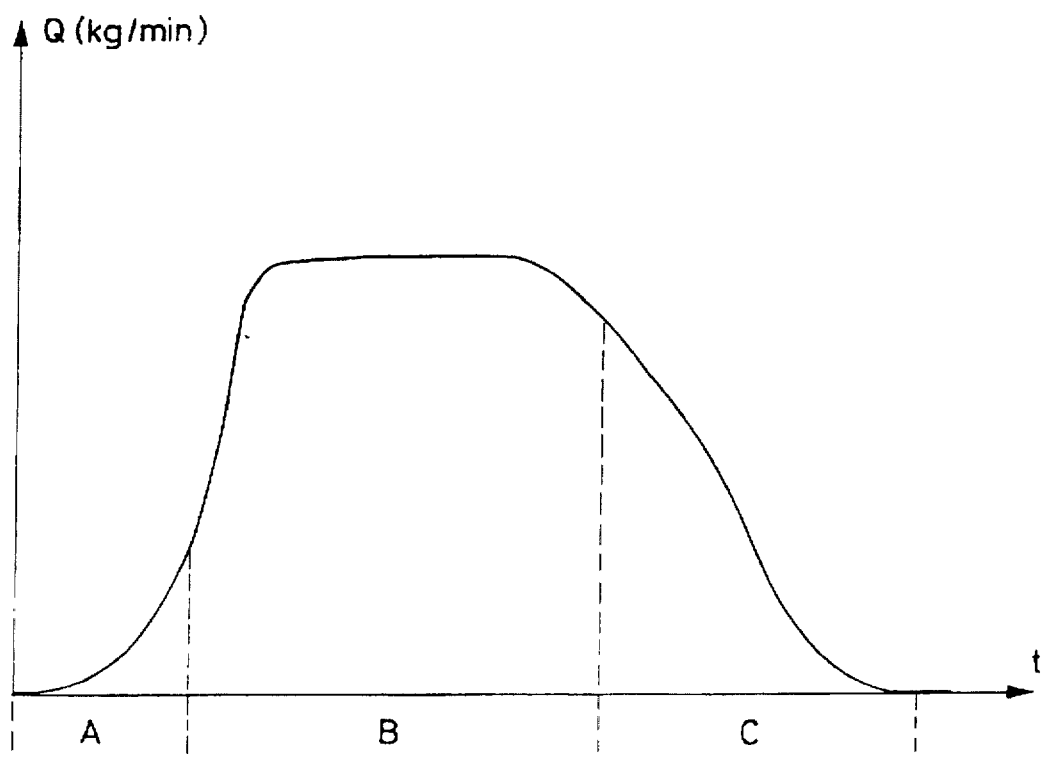
FIG. 1 shows a flow/time graph of a milking interval.

The graph according to FIG. 1 illustrates a typical milking interval when milking an animal, including in sequence an initial massage period A, during which the milk flow Q begins, a main flow period B, during which the milk flow rapidly increases to a main flow and then amounts to said main flow, and a flow terminating period C, during which the milk flow decreases and finally ceases. The duration of the milking interval is usually about four to seven minutes.

Figure 2:
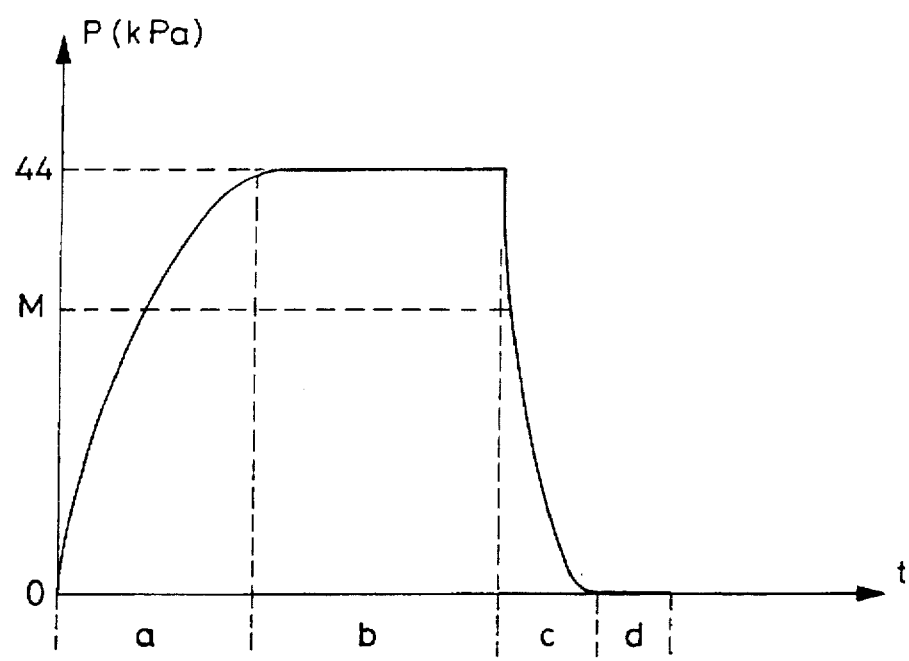
FIG. 2 shows a pressure/time graph of a pulsation cycle for the pulsating vacuum in a teatcup according to conventional practice.

During the milking interval the animal's teats are inserted in collapsable rubber liners and the milk is sucked out of the teats by exposing the interior of the liners under the teats to a milking vacuum, conventionally about 44 kPa for low level milking system, while each liner is exposed to an exterior pulsating vacuum causing the liner to open and close in a series of pulsation cycles. The graph according to FIG. 2 illustrates said pulsating vacuum during one such pulsation cycle, as it appears in conventional milking. Thus, the pulsation cycle includes in sequence an opening phase a in which the pulsating vacuum level increases from zero (atmospheric pressure) to open the liner, an open phase b in which the pulsating vacuum level has reached its peak level, typically about 44 kPa, and keeps the liner open, a closing phase c in which the pulsating vacuum level is decreased from its peak level to close the liner, and a closed phase d in which the pulsating vacuum level is zero (atmospheric pressure) to keep the liner closed. Milk is flowing from the teat when the pulsating vacuum level is above a level M noted in the graph of FIG. 2, whereas milk flow is interrupted and the teat is at rest when the pulsating vacuum level is below said level M. The ratio of the opening and open phases (a+b) to the closing and closed phases (c+d) known as the pulsator ratio (a+b):(c+d) is usually 65:35 for milking machines of Alfa Laval.

The number of complete pulsation cycles in one minute known as the pulsation rate is normally within the range of 50–60 cycles per minute. The graph according to FIG. 3 illustrates some pulsation cycles of an ordinary pulsating vacuum having a pulsation rate of 60 cycles per minute.

Figure 4:
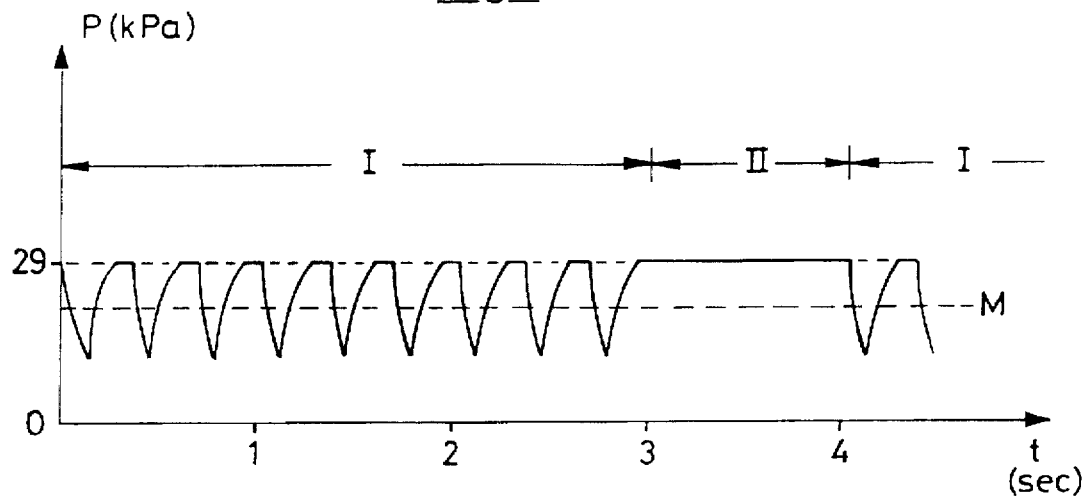
FIG. 4 shows a pressure/time graph of the exterior vacuum acting on a liner when milking a teat according to the method of the invention.

The graph according to FIG. 4 illustrates the exterior vacuum acting on a teat's liner when milking a cow having four teats according to a preferred embodiment of the invention. The milking vacuum level and the peak level of the pulsating vacuum is considerably reduced, from 44 kPa according to current practice to only 29 kPa.

The milking of each teat is periodically alternated between a first mode of operation I, in which the pulsating vacuum has a rate of 180 cycles per minute and the pulsator ratio is 80:20, and a second mode of operation II, in which the pulsating vacuum is kept at its peak level 29 kPa to keep open the teat's liner. Each period of the first mode of operation I lasts for three seconds, whereas each period of the second mode of operation II lasts for one second.

Figure 3:
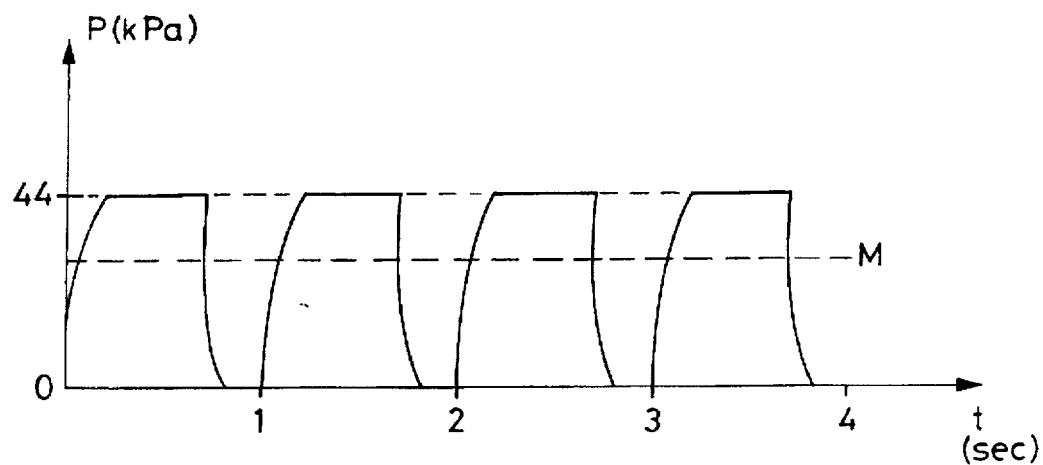
FIG. 3 shows a pressure/time graph of a series of pulsation cycles produced by a conventional milking machine.

As seen from the graph of FIG. 4, during the first mode of operation I, the closed phase d of each pulsation cycle is eliminated and the open phase b of each pulsation cycle is relatively short, as compared with the ordinary pulsating vacuum illustrated in the graph of FIG. 3. This means that the teat in fact is relaxed during the first mode of operation I, because only a small quantity of milk is sucked out of the teat during each open phase b of the pulsation cycles, or more specifically, when the pulsating vacuum level is above a level M indicated in the graph of FIG. 4. When the pulsating vacuum level is below said level M, the teat is recovered and refilled with milk from the udder. During the second mode of operation II substantially all of the milk in the teat is sucked out.

The cow's four teats are sequentially milked according to the second mode of operation II, so that three teats are always milked according to the first mode of operation I.

Figure 6:
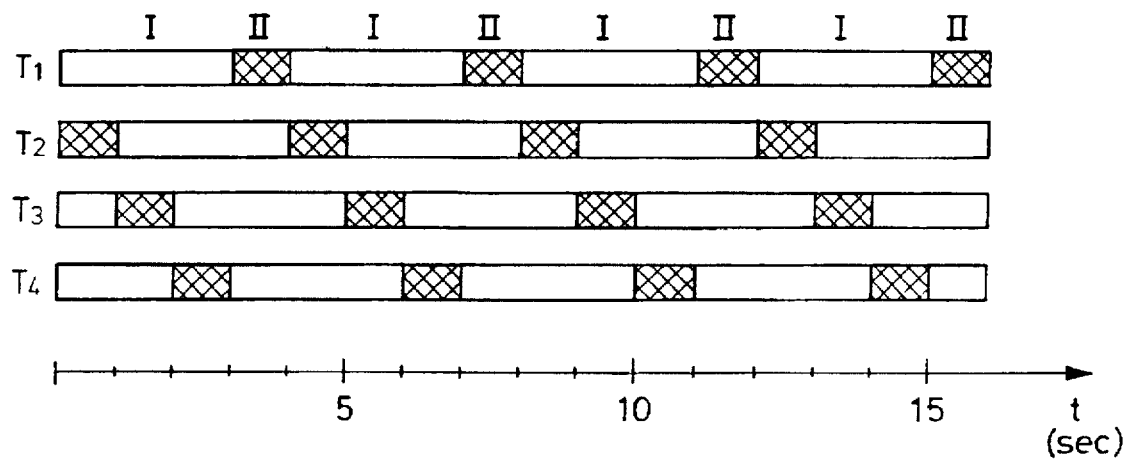
FIG. 6 is a constitutional diagram illustrating the sequenced milking of four teats according to the method of the invention, and FIG. 7 schematically shows a milking machine for performing the method according to the invention.
Figure 7:
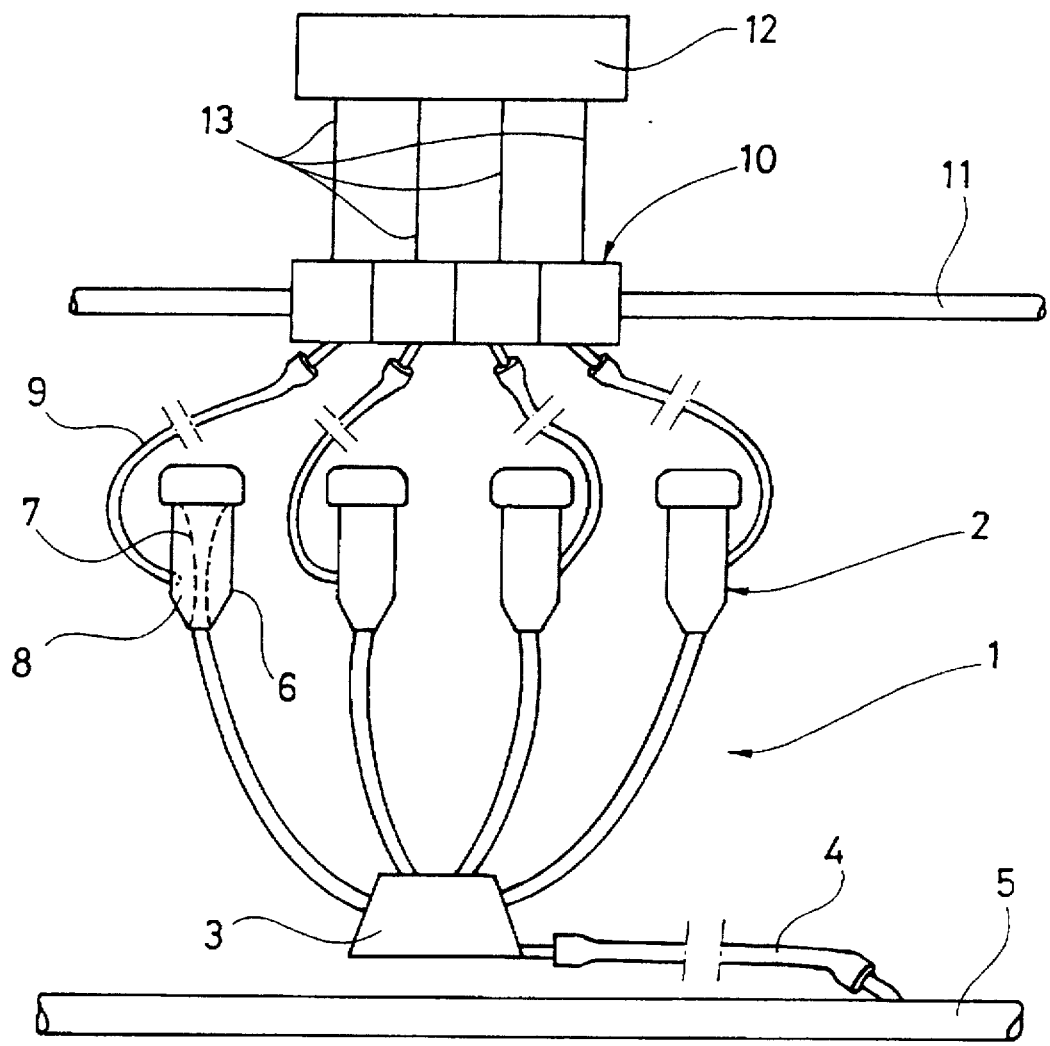

This is understood by studying the diagram of FIG. 6 illustrating the periodic shifts between the first and second modes of operation I and II for the respective teats $T_1$-$T_4$. The milking vacuum level can be as low as 29 kPa without risking any teatcup falling off.

Figure 5:
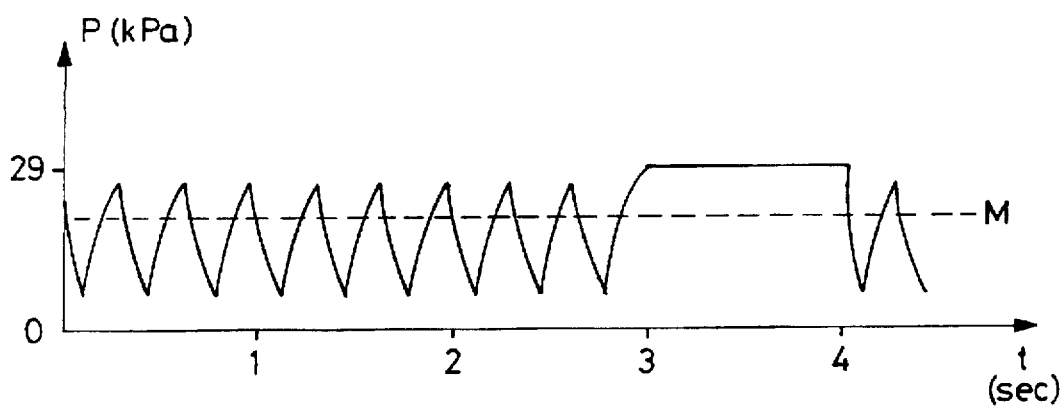
FIG. 5 shows the same graph as FIG. 4, except that the milking is performed with a different pulsator ratio.

The pattern of the pulsating vacuum during the first mode of operation I may be modified by changing pulsation rate or pulsator ratio. For instance, the graph of FIG. 5 illustrates how the pattern of the pulsating vacuum is modified when the pulsator ratio is 65:35, while the pulsation rate still is 180 cycles/minute. In this case, both the open phase b and closed phase d of each pulsation cycle are eliminated. Milk is still extractable from said three teats when the pulsating vacuum level is above the level M indicated in the graph of FIG. 5.

The milking method according to the invention may well be carried out during the entire milking interval. Alternatively, it may be carried out only during one of the initial massage period A and flow terminating period C, or only during both of these periods A and C, see FIG. 1. During the period or periods when milking is not carried out by the method of the invention conventional milking may be practised, for instance in accordance with the milking illustrated in FIG. 3.

FIG. 6 shows a low level milking machine for performing the method according to the invention, comprising a milking cluster 1 having four teatcups 2 connected to a milk claw 3. A milk tube 4 extends from the milk claw 3 to a milk pipeline 5, which is connected to a source of vacuum not shown. Each teatcup 2 includes a rigid shell 6 enclosing a liner 7 to form a pulsation chamber 8 therebetween.

Four pulse tubes 9 connect the pulsation chambers 8 separately to a pulsator means 10, which is adapted to connect the four pulse tubes 9 independently of one another to atmosphere or to a source of vacuum (not shown) via a vacuum pipeline 11. For instance, the pulsator means 10 may comprise four separate electromagnetic valves for the connection of the pulse tubes 9 to atmosphere or the source of vacuum. A control means 12 equipped with a 4-channel pulse generator and a timer is connected to the pulsator means 10 via four control lines 13.

The pulsator means 10 is operable by the control means 12 to periodically alternate between a first mode of operation I, in which the pulsator means 10 cyclically connects the vacuum pipeline 11 to any pulsation chamber 8 to provide a pulsating vacuum therein, and a second mode of operation II, in which the pulsator means 10 maintains the vacuum pipeline 11 connected to said pulsation chamber 8 to provide a constant vacuum therein.

I claim:

1. A method of milking an animal, in which the animal's teats are inserted into collapsible tubular liners and the interior of the liners under the teats is exposed to a milking vacuum for extracting milk from the teats, comprising periodically alternating the milking of each teat between a first mode of operation, in which the liner on the teat is exposed to an exterior pulsating vacuum causing the liner to open and close in a series of pulsation cycles, and a second mode of operation, in which the liner is exposed to an exterior substantially constant vacuum, which is high enough to keep the liner in a substantially fully open state, the duration of the second mode of operation being at least as long as the duration of a plurality of pulsation cycles of the first mode of operation.

2. A method according to claim 1, wherein an animal having four teats is milked such that two of the teats are milked according to said first mode of operation, while the other two teats are milked according to said second mode of operation.

3. A method according to claim 2, wherein the number of pulsation cycles per minute is at least 90.

4. A method according to claim 3, wherein the number of pulsation cycles per minute is about 180.

5. A method according to claim 2, wherein the level of the milking vacuum is in the range of 15–60 kPa.

6. A method according to claim 5, wherein the level of the milking vacuum is in the range of 25–30 kPa.

7. A method according to claim 1, wherein said first mode of operation is of a longer duration than said second mode of operation.

8. A method according to claim 7, wherein the number of pulsation cycles per minute is at least 90.

9. A method according to claim 8, wherein the number of pulsation cycles per minute is about 180.

10. A method according to claim 7, wherein the level of the milking vacuum is in the range of 15–60 kPa.

11. A method according to claim 10, wherein the level of the milking vacuum is in the range of 25–30 kPa.

12. A method according to claim 1, wherein the animal's teats are sequentially milked according to said second mode of operation.

13. A method according to claim 12, wherein an animal having four teats is milked such that three teats are milked according to said first mode of operation, while one teat is milked according to said second mode of operation.

14. A method according to claim 13, wherein the duration of said first mode of operation is three seconds, whereas the duration of said second mode is one second.

15. A method according to claim 1, wherein the number of pulsation cycles per minute is at least 90.

16. A method according to claim 1, wherein the level of the milking vacuum is in the range of 15–60 kPa.

17. A method according to claim 16, wherein the level of the milking vacuum is in the range of 25–30 kPa.

18. A milking machine for performing the method according to claim 1, the milking machine comprising:

a milking cluster having a number of teatcups with liners for receiving teats to be milked;

a pulsation chamber being defined between each teatcup and its liner; and means adapted to connect a source of vacuum to the respective pulsation chambers independently of one another and being operable to periodically alternate between the first mode of operation and the second mode of operation.

* * * * *